United States Patent
Blond et al.

(10) Patent No.: US 11,229,316 B2
(45) Date of Patent: Jan. 25, 2022

(54) METHOD FOR CONTROLLING A CULINARY PREPARATION APPARATUS

(71) Applicant: SEB S.A., Ecully (FR)

(72) Inventors: Laurent Blond, Beaune (FR); François Retif, Duon (FR); Jean-Yves Beaudet, Saint-Julien-du-Terroux (FR)

(73) Assignee: SEB S.A., Ecully (FR)

( * ) Notice: Subject to any disclaimer, the term of this patent is extended or adjusted under 35 U.S.C. 154(b) by 290 days.

(21) Appl. No.: 16/063,123

(22) PCT Filed: Dec. 14, 2016

(86) PCT No.: PCT/EP2016/080928
§ 371 (c)(1),
(2) Date: Jun. 15, 2018

(87) PCT Pub. No.: WO2017/102809
PCT Pub. Date: Jun. 22, 2017

(65) Prior Publication Data
US 2020/0237143 A1    Jul. 30, 2020

(30) Foreign Application Priority Data

Dec. 16, 2015    (FR) .................................... 15/62474

(51) Int. Cl.
*A47J 36/32* (2006.01)
*A47J 27/04* (2006.01)
(Continued)

(52) U.S. Cl.
CPC ................ *A47J 36/32* (2013.01); *A23L 5/13* (2016.08); *A23L 5/15* (2016.08); *A47J 27/004* (2013.01);
(Continued)

(58) Field of Classification Search
CPC ..... A23L 5/13; A23L 5/15; A47J 36/32; A47J 27/004; A47J 27/04; A47J 43/0716; A23J 44/00
See application file for complete search history.

(56) References Cited

U.S. PATENT DOCUMENTS

2003/0188769 A1 * 10/2003 Eisenberg ................. B08B 9/32
134/57 D
2011/0134413 A1    6/2011 Has et al.
(Continued)

FOREIGN PATENT DOCUMENTS

CN        201767746 A        3/2011
CN        102056356          5/2011
(Continued)

OTHER PUBLICATIONS

International Search Report for Application No. PCT/EP2016/080928.
(Continued)

*Primary Examiner* — Mark A Connolly
(74) *Attorney, Agent, or Firm* — Cantor Colburn LLP (57) ABSTRACT

The invention relates to an internal control method for a food processor appliance (A), comprising the following steps of: (E1) reception of a control data item (Cde) including a control command (IC); (E2) generation of a state data item (IE) by the control unit; (E3) transmission of the state data item (IE); (E4) reception of a confirmatory control command (ICC); (E5) triggering of the execution of a given task by at least one given functional element, corresponding to the control command (IC).

5 Claims, 4 Drawing Sheets

(51) Int. Cl.
  *A23L 5/10* (2016.01)
  *A47J 27/00* (2006.01)
  *A47J 43/07* (2006.01)
  *A47J 44/00* (2006.01)

(52) U.S. Cl.
  CPC ........... *A47J 27/04* (2013.01); *A47J 43/0716* (2013.01); *A47J 44/00* (2013.01); *A23V 2002/00* (2013.01); *A47J 2027/043* (2013.01)

(56) References Cited

U.S. PATENT DOCUMENTS

| | | | | |
|---|---|---|---|---|
| 2014/0039650 | A1* | 2/2014 | Baraille | A47J 36/321 |
| | | | | 700/90 |
| 2014/0098445 | A1* | 4/2014 | Hooper | G08B 17/06 |
| | | | | 361/42 |
| 2014/0269154 | A1 | 9/2014 | Kolar et al. | |
| 2014/0345474 | A1 | 11/2014 | Trench Rocha et al. | |
| 2015/0305551 | A1* | 10/2015 | Rosati | A47J 27/21008 |
| | | | | 426/231 |
| 2016/0081515 | A1* | 3/2016 | Aboujassoum | F24C 7/083 |
| | | | | 426/231 |
| 2017/0031337 | A1* | 2/2017 | Jablokov | G08C 17/02 |

FOREIGN PATENT DOCUMENTS

| | | |
|---|---|---|
| CN | 102136049 A | 7/2011 |
| CN | 102148831 A | 8/2011 |
| CN | 102169567 A | 8/2011 |
| CN | 102279915 A | 12/2011 |
| CN | 103399556 A | 11/2013 |
| CN | 104158812 A | 11/2014 |
| CN | 104305858 | 1/2015 |
| CN | 105125088 A | 12/2015 |
| EP | 1612746 A | 1/2006 |
| JP | H04216111 A | 8/1992 |
| WO | 2014023882 A2 | 2/2014 |
| WO | 2015051446 A1 | 4/2015 |

OTHER PUBLICATIONS

Written Opinion for Application No. PCT/EP2016/080928.
CN First Office Action for Application No. 2016800730054.
CN First Search for Application No. 2016800730054.
English Translation CN First Office Action for Application No. 2016800730054.
CN Second Office Action for Application No. 2016800730054.
English Translation CN Second Office Action for Application No. 2016800730054.
Supplementary Search for Application No. 2016800730054.

* cited by examiner

METHOD FOR CONTROLLING A CULINARY PREPARATION APPARATUS

CROSS REFERENCE TO RELATED APPLICATIONS

This application is a National Stage of PCT Application No. PCT/EP2016/080928 filed on Dec. 14, 2016, which claims priority to French Patent Application No. 15/62474 filed on Dec. 16, 2015, the contents each of which are incorporated herein by reference thereto.

TECHNICAL FIELD

The present invention concerns a method for controlling a culinary preparation apparatus.

BACKGROUND

It is known to use a culinary preparation apparatus comprising at least one functional element capable of executing a particular task.

A functional element may for example be a rotating driver arranged to mix at least one ingredient in a working container of the culinary preparation apparatus or a heating element of at least one food disposed in said working container.

It is also known to use a culinary preparation apparatus having a control entity capable of monitoring the execution of said task and possibly capable of interrupting said task in order to resume it afterwards if a safety condition is not respected. It may be for example the opening of a closure lid upon the execution of a task by the culinary preparation apparatus.

It is also known to remotely control a culinary preparation apparatus for launching said task.

This remote control is advantageous because it is possible to offset part of the memory and of the control elements of the culinary preparation apparatus in another remote element, for example a terminal.

However, offsetting the controls of the culinary preparation apparatus to a remote element results in allowing a start-up of the remote culinary preparation apparatus.

Thus, the user may be at a distance from the culinary preparation apparatus and not see it although the terminal is capable of launching a task remotely.

The start-up of the culinary preparation apparatus while the user may be in another room may cause safe use issues, in particular depending on the configuration of the vicinity of the apparatus. A safe use issue may also result from the involuntary launching of a task.

BRIEF SUMMARY

The present invention aims at solving all or part of the above-mentioned drawbacks.

To this end, the present invention concerns an internal control method of a culinary preparation apparatus comprising a control entity arranged to receive control pieces of information according to a communication protocol and at least one functional element capable of being controlled by the control entity and capable of performing a task, the internal control method of the culinary preparation apparatus comprising the following steps:
  receiving a control piece of information comprising a control instruction related to at least one functional element determined by the control entity,
  generating a state piece of information by the control entity, the state piece of information being related to the ability of the at least one determined functional element to execute said control instruction,
  transmitting the state piece of information by the control entity to a warning device of the culinary preparation apparatus, the warning device being capable of emitting a signal related to said state piece of information,
  receiving a confirmatory control instruction by the control entity coming from a user interface of the culinary preparation apparatus,
  triggering the execution of a task determined by the at least one determined functional element corresponding to the control instruction.

The control piece of information determines the task which is then executed by the at least one corresponding functional element. The culinary preparation apparatus is arranged to receive this control piece of information and execute it.

Thus, when the control piece of information comes from a remote system, the task is not executed directly after sending the control piece of information to the culinary preparation apparatus: a validation via the user interface is required.

This disposition therefore allows securing the use of the culinary preparation apparatus because the task is executed only after transmission of the control instruction and then of the confirmatory control instruction.

For example, when the control piece of information is sent by mistake, the task is not executed and there is no need to rush on the culinary preparation apparatus in order to stop its execution.

According to another example, when the control piece of information is correctly sent but the culinary preparation apparatus is located out of sight of the user, the execution of the task could be risky.

The risks may be, for example, due to children in the vicinity of the culinary preparation apparatus who may be tempted to touch it when seeing the task being executed.

Also, the risks may be due to other devices disposed in the vicinity of the culinary preparation apparatus and that could interfere with the operation of the culinary preparation apparatus during the execution of the task.

According to an aspect of the invention, the communication protocol is a contactless remote communication protocol, preferably bidirectional, for example according to a communication standard allowing a bidirectional exchange of data through radio waves.

According to an aspect of the invention, the internal control method of the culinary preparation apparatus comprises, after the step of transmitting the state piece of information by the control entity to the warning device, a step of emitting the signal related to said state piece of information by the warning device, said signal being a physical signal perceptible by the user.

The user is therefore informed of the arrangement of the culinary preparation apparatus to execute a task when it is in the vicinity of the warning device.

According to an aspect of the invention, the warning device is arranged or disposed on a case of the culinary preparation apparatus.

Thus, the user should be in the vicinity of the culinary preparation apparatus in order to see for himself that the apparatus is ready to launch the task and that this task can be launched safely.

According to an aspect of the invention, the physical signal perceptible by the user corresponds to a sound signal and/or a visual signal and/or a signal perceptible by the touch.

Preferably, the warning device comprises a loudspeaker and/or a light element and/or a button, particularly a button capable of being displaced between a warning position and a non-warning position.

According to an aspect of the invention, the step of receiving a confirmatory control instruction from the control entity is preceded by a step of acquiring the confirmatory control instruction by the user interface, said acquisition consisting in acquiring a user input.

According to an aspect of the invention, the user interface is disposed on or arranged in the case of the culinary preparation apparatus.

Thus, the user must be in the immediate vicinity of the culinary preparation apparatus in order to launch the execution of the determined task by making an input at the user interface.

This disposition therefore contributes to the safe use of the culinary preparation apparatus because the user can make sure of himself that the culinary preparation apparatus is in the optimal dispositions for the determined task to be launched.

Optimal disposition means, for example, the fact that no disturbing element external to the culinary preparation apparatus is not likely to interrupt the course of the execution of the determined task once launched.

According to an aspect of the invention, the user input corresponds to an input capable of being detected by the user interface in the form of motion detection and/or sound detection—preferably related to a particular sound or a determined speech—and/or detection of pressure on a determined portion of the user interface.

According to an aspect of the invention, the user interface comprises an input unit provided with a motion detector and/or a sound detector and/or a contact detector by a user.

Particularly, the contact detector is arranged in a button capable of being triggered by the user.

According to an aspect of the invention, the warning device is arranged in or disposed on the user interface or is capable of emitting a signal via the user interface.

Thus, the warning of the user informing him that the culinary preparation apparatus is ready and the triggering of the determined task can be both performed from the user interface.

According to an aspect of the invention, the warning device and the user interface are at least partially arranged in a button capable of being requested by the user.

According to an aspect of the invention, the step of receiving a control piece of information by the control entity is followed by a configuration step carried out by the control entity and consisting in checking the ability of the at least one functional element and/or in arranging it for the execution of the determined task.

The configuration step corresponds to a particular establishment or arrangement of the culinary preparation apparatus for the execution of the determined task to come.

The configuration step is therefore not automatically followed by the launching of the execution of the determined task: a confirmatory control instruction is required.

According to an aspect of the invention, checking the ability of the at least one functional element to execute the determined task corresponds to performing a monitoring of the parameters by the control entity related to the ability of said at least one functional element to perform the determined task.

Preferably, at least part of the parameters intended to be monitored are obtained by sensor measurements capable of communicating with the control entity, such as weight sensors, position sensors, or sensors for monitoring physical quantities such as a voltage or an intensity. Said sensors are comprised in the culinary preparation apparatus.

According to an aspect of the invention, arranging the at least one functional element for the execution of the determined task corresponds to at least partially establishing or disposing at least one functional element into a suitable configuration for the beginning of the determined task to be accomplished.

According to an aspect of the invention, the control instruction is capable of being interpreted by the control entity and comprises in particular a reference interpretable by the control entity as being related to a determined task.

Thus, the control instruction may be a brief piece of information referring concisely to the determined task. Indeed, the determined task can be complex and involve several functional elements requested at the same time or in turn according to an accurate diagram. This diagram can be comprised in the memory of the control entity.

Alternatively, and according to another aspect of the invention, the control instruction comprises an operating diagram related to the duration and operating conditions of the at least one functional element involved in the execution of the determined task.

Thus, it is possible to make the culinary preparation apparatus execute a task that is not known to the memory of the control entity. This disposition is interesting because it allows for example performing particular tasks of cooking recipes that were not known at the time of performing the control entity or that have been deliberately considered as not to be stored in the memory of the culinary preparation apparatus.

Also alternatively, the control instruction may comprise a sequence of parameters defining the task to be accomplished, the parameters corresponding for example to a cooking duration or a cooking time.

According to an aspect of the invention, the step of triggering the execution of a determined task is followed by a step of executing the task determined by the at least one determined functional element corresponding to the control instruction, the determined task corresponding to the execution by the at least one determined functional element of at least one elementary operation according to a determined operating time and/or according to a determined power and/or according to a setting determined by said at least one determined functional element.

After the validation of the user by sending the confirmatory control instruction, the culinary preparation apparatus is capable of executing the determined task in its entirety without the necessity of sending other control instructions.

Thus, the culinary preparation apparatus is capable of receiving a control instruction, storing it in memory, then executing the corresponding task without the preparation apparatus being controlled remotely during the execution of the task.

During the execution of the determined task, the culinary preparation apparatus is master, that is to say, it monitors the execution of the task.

According to an aspect of the invention, the elementary operation corresponds to a culinary preparation step of at least one food disposed in at least one working container of the culinary preparation apparatus.

The determined task is performed in a dedicated working container of the culinary preparation apparatus. According to an aspect of the invention, the determined task corresponds to a cooking recipe step.

According to an aspect of the invention, the control entity is capable of performing the interruption and/or the resumption of said determined task during the step of executing the determined task.

Thus, the control entity can interrupt the execution of a task, for example when a safety monitoring performed by the control entity on the operation of the culinary preparation apparatus reveals a dysfunction.

According to an aspect of the invention, a safety monitoring can be performed by a sensor of the culinary preparation apparatus for the purpose of checking whether a disposition of an element of the apparatus is correct in order to ensure a safe operation.

According to an example, a sensor may be capable of checking whether a closure lid of a working container is closed properly when executing a task in said working container.

When the safety monitoring corresponds to a normal disposition of the elements of the culinary preparation apparatus, the task may be executed from the beginning or resume its execution at the state of progress achieved when the task has been interrupted.

According to an aspect of the invention, the control entity is capable, during the step of executing said determined task, of checking the ability or the correct configuration of the at least one functional element to execute the determined task According to an aspect of the invention, the checking of the ability of the at least one functional element to execute the determined task corresponds to the checking carried out during the configuration step.

According to an aspect of the invention, the internal control method of a culinary preparation apparatus comprises a step of emitting a monitoring piece of information by the control entity corresponding to a monitoring request received by the control entity and concerning the progress of the execution of the determined task and/or concerning an anomaly of operation of the culinary preparation apparatus and/or a conformity of operation of the culinary preparation apparatus.

According to an aspect of the invention, a control piece of information coming from the terminal may comprise a monitoring request. Particularly, said monitoring request corresponds to an interrogation of the control entity on the good receiving of said control piece of information.

Preferably, the monitoring piece of information is emitted according to the communication protocol.

Thus, after receiving the control piece of information, the culinary preparation apparatus knows, thanks to the control instruction, the task it must execute and informs of the progress of the execution of the task.

This monitoring piece of information may for example correspond to a zero execution progress when the execution of the task is not triggered.

The present invention also concerns a culinary preparation apparatus arranged to execute the steps of the internal control method as described previously.

According to an aspect of the invention, the culinary preparation apparatus comprises a control entity arranged to receive control pieces of information according to a communication protocol, at least one functional element capable of being controlled by the control entity and capable of performing a task, a warning device being capable of emitting a signal and a user interface capable of acquiring the confirmatory control instruction.

The present invention further concerns a method for controlling a culinary preparation apparatus via a terminal, the terminal being arranged to send control pieces of information according to a communication protocol to said culinary preparation apparatus, the method comprising the following steps:

selecting a determined task intended to be accomplished by at least one determined functional element of the culinary preparation apparatus, sending a control piece of information to the culinary preparation apparatus, the control piece of information comprising a control instruction related to said task to be executed.

Thus, a user can choose a determined task intended to be accomplished by a remote culinary preparation apparatus and control this apparatus for the execution of this task.

According to an aspect of the invention, the method for controlling a culinary preparation apparatus further comprises a step of receiving a monitoring piece of information related to the progress of the execution of the determined task coming from the culinary preparation apparatus.

The culinary preparation apparatus controls and monitors the execution of the determined task. It is also capable of sending a monitoring piece of information to the terminal in order to inform the latter of the state of progress of the execution of the determined task.

According to an aspect of the invention, the step of receiving a monitoring piece of information is preceded by a step of sending a corresponding monitoring request by the terminal to the culinary preparation apparatus.

Preferably, the monitoring request is comprised in a control piece of information, particularly the control piece of information further comprising a control instruction related to at least one functional element determined by the control entity.

Thus, the monitoring request may be sent at any time by the terminal and corresponds to an update of the status of the culinary preparation apparatus. It is thus possible for a user to know remotely through the terminal, monitoring pieces of information related to the state of the culinary preparation apparatus.

The monitoring request may also be comprised in a control piece of information sent to the culinary preparation apparatus. Thus, while sending a setpoint to the culinary preparation apparatus for performing a determined task, it is possible to inquire about the state of the culinary preparation apparatus. For example, it is possible to receive a monitoring piece of information reporting that the closure lid of the culinary preparation apparatus is open.

According to an aspect of the invention, the terminal is arranged to receive pieces of information coming from a database comprising a plurality of tasks intended to be executed by the culinary preparation apparatus.

According to an aspect of the invention, the database is comprised in a server remote from the terminal. Preferably the terminal is arranged to send a request for retrieving at least one control piece of information to a management system of the database, The present invention also concerns a computer program product comprising code instructions arranged to implement the steps of a method for controlling a culinary preparation apparatus as described above, when said program is run on a processor of a terminal.

According to an aspect of the invention, the computer program product is arranged in the form of an application downloadable on a terminal when said program is run on a processor of said terminal.

The present invention further concerns a terminal comprising in memory the code instructions of a computer program product as described above, the terminal comprising a processor arranged to run such a computer program product.

The present invention also concerns an interface and control set for a culinary preparation apparatus. Such an interface and control set is integrated in a case of the culinary preparation apparatus and comprises a control circuit.

The interface and control set is satisfactory in that it can be replaced by another one as part of the after-sales service. Thus, if an operation problem is due to the monitoring part of the culinary preparation apparatus, the mechanical part, which is in general still in good condition, may be preserved.

However, it is not always possible to equip the culinary preparation apparatus with the latest available version of the interface and control set, this latest version having more control functions.

Indeed, the case in which the interface and control set should be installed, imposes a limit of size and shape for the interface and control set. In this context, the design of new versions of the interface and control set is constrained by the lack of space. It is particularly difficult to include new monitoring and/or control elements.

The invention aims at solving all or part of the drawbacks mentioned above.

As such, the invention concerns an interface and control set for a culinary preparation apparatus comprising:

a control circuit arranged to emit a signal for controlling at least one functional element of the culinary preparation apparatus, a communication circuit arranged to communicate according to a known communication protocol, for example a bidirectional communication protocol through radio-waves, the communication circuit being further capable of exchanging pieces of information with the control circuit, a support onto which are attached or in which are arranged the control circuit and the communication circuit, the support comprising fasteners to a frame of the culinary preparation apparatus.

The interface and control set is easy to handle because all the elements thereof are secured together. It is thus possible to easily change the interface and control set of a culinary preparation apparatus.

This arrangement is interesting because it is possible to develop the culinary preparation apparatus while preserving the mechanical part and the control circuit of the culinary preparation apparatus.

The presence of a communication circuit is also advantageous. The geometry constraints that the interface and control set must observe are therefore no longer a limit on the development of control and/or monitoring functionalities.

Indeed, the control part of the culinary preparation apparatus can thus be offset to a remote terminal, which allows saving space in the case.

According to an aspect of the invention, the control circuit further comprises a socket adapted to be plugged to a power circuit of the culinary preparation apparatus or to a connecting element to said power circuit.

This disposition allows preserving the power part in the frame of the culinary preparation apparatus. Thus, when changing the interface and control set, the culinary preparation apparatus preserves its functional elements and the power part that supplies these functional elements with electrical energy.

According to an aspect of the invention, the interface and control set further comprises a control panel attached onto or arranged in the support, the control panel being arranged to exchange pieces of information with the control circuit.

This disposition allows developing the controls of the culinary preparation apparatus. The controls can also be developed with each new version of the interface and control set.

According to an aspect of the invention, the control panel comprises a user interface. Preferably, the user interface comprises a set of buttons, a motion detector and/or a sound acquisition device.

According to an aspect of the invention, the user interface comprises a warning device. Particularly, the warning device comprises a display screen and/or an indicator light.

According to an aspect of the invention, the interface and control set further comprises an accelerometer attached onto or arranged in the support. This disposition allows detecting the displacement of the culinary preparation apparatus during its operation.

It is thus possible to stop the operation of the rotating driver when a displacement is detected so as to avoid for example the fall of the apparatus off a table. Indeed, the displacement can be generated by an unbalance due to the rotating element in operation.

The present invention also concerns a culinary preparation apparatus comprising an interface and control set as described above.

BRIEF DESCRIPTION OF THE DRAWINGS

In any case, the invention will be better understood using the following description with reference to the appended schematic drawings showing, by way of non-limiting example, an embodiment of this control method, of this terminal and of this culinary preparation apparatus.

DETAILED DESCRIPTION

Figure 1:
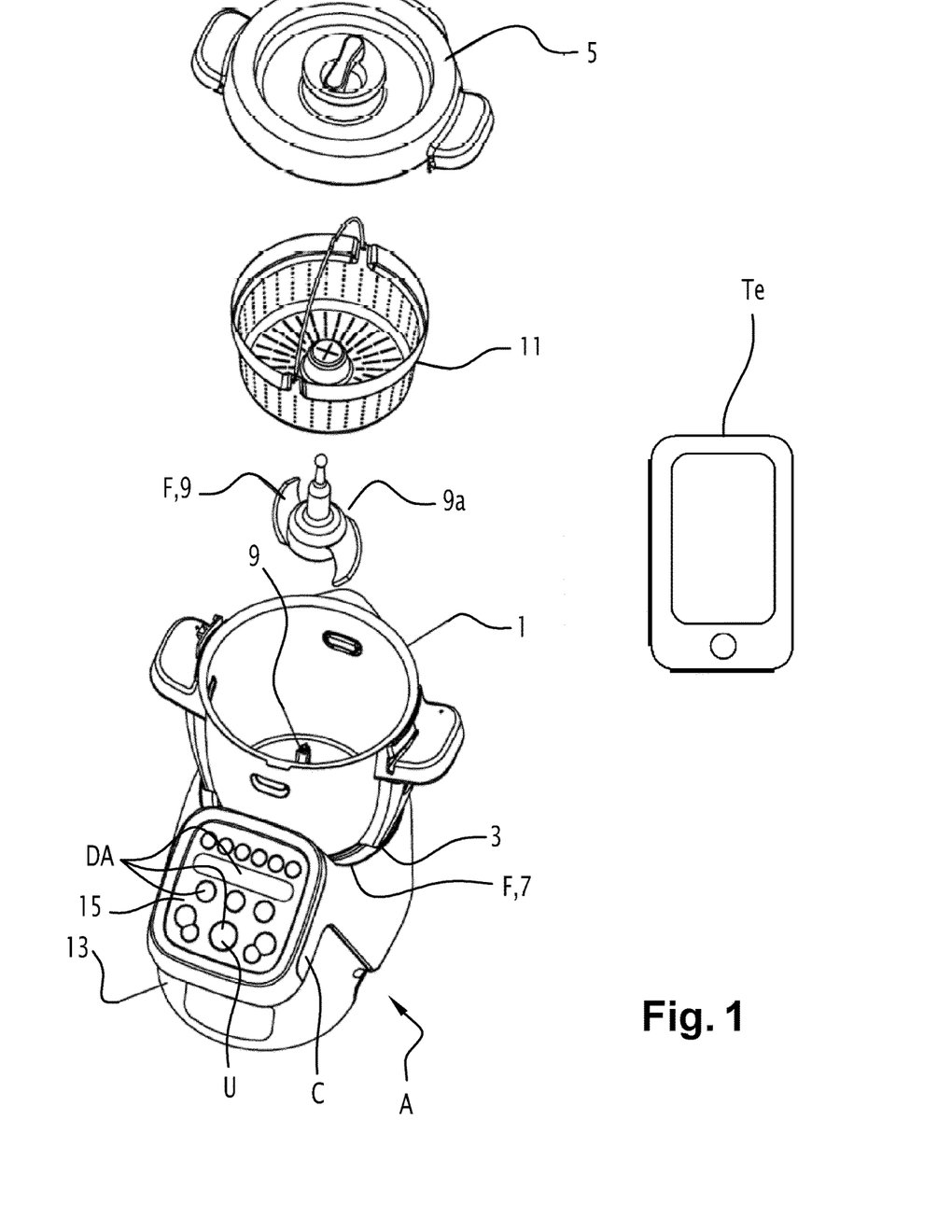
FIG. 1 is an exploded view of a culinary preparation apparatus and of a terminal.

As illustrated in FIG. 1, a culinary preparation apparatus A comprises a removable working container 1. This working container 1 comprises a bottom 3 and a closure lid 5.

The culinary preparation apparatus A comprises functional elements F for example a heating plate 7 arranged to heat the bottom of the container 1 and a rotating driver 9 arranged to chop and/or stir at least one food disposed in the container 1.

Figure 4:
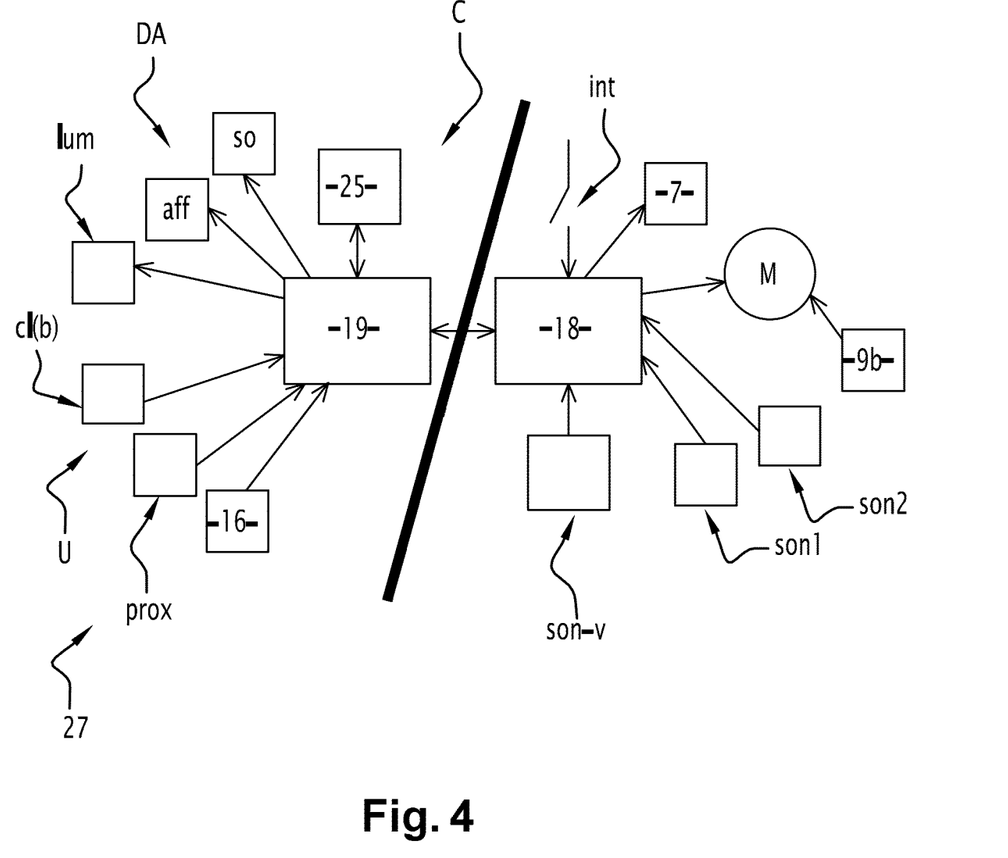
FIG. 4 is a diagram of a control panel and of a control entity of the culinary preparation apparatus.

As illustrated in FIG. 4, the rotating driver 9 comprises a motor M, a temperature measuring probe in the chopping and/or stirring element 9*a* and motor 9*a*.

The culinary preparation apparatus A may also comprise a basket 11 arranged to cooperate with the upper part of the working container 1 and to receive some foods, for example for steam cooking.

The culinary preparation apparatus A further comprises a case 13 provided with a control panel 15 and a control entity C.

The control panel 15 comprises a user interface U arranged to acquire an input performed by a user. To this end, the user interface U comprises a keyboard cl provided with buttons b. The user interface U may also comprise a motion detector or a proximity detector prox arranged to detect a user control corresponding to a motion of the user.

Optionally, the control panel 15 may further comprise an accelerometer 16 arranged to detect the displacement of the culinary preparation apparatus A.

This disposition is particularly interesting for reducing the risks of falling of the culinary preparation apparatus A. Thus, if the culinary preparation apparatus A is disposed at the edge of a table and that its operation causes a displacement because of an unbalance due to the rotating driver 9, the control entity C is arranged to stop the rotation of the rotating driver 9.

The user interface U may also comprise a sound acquisition device allowing a voice input of a user control.

The user interface U further comprises a warning device DA. As illustrated in FIG. 4, the warning device DA comprises for example a display screen aff, an audible warning device so and/or an indicator light lum which can be disposed below a button b.

The culinary preparation apparatus A is arranged to be controlled by a user for making cooking recipes. The user is assisted by the control entity C which has a memory in which a set of cooking recipes is stored. In this sense, the user interface U allows assisting the user for making a recipe. The user can trigger tasks T intended to be accomplished by the functional elements F according to the course of the recipe.

The control entity C in combination with the user interface U thus provides the user with an assistance in making a cooking recipe.

Figure 2:
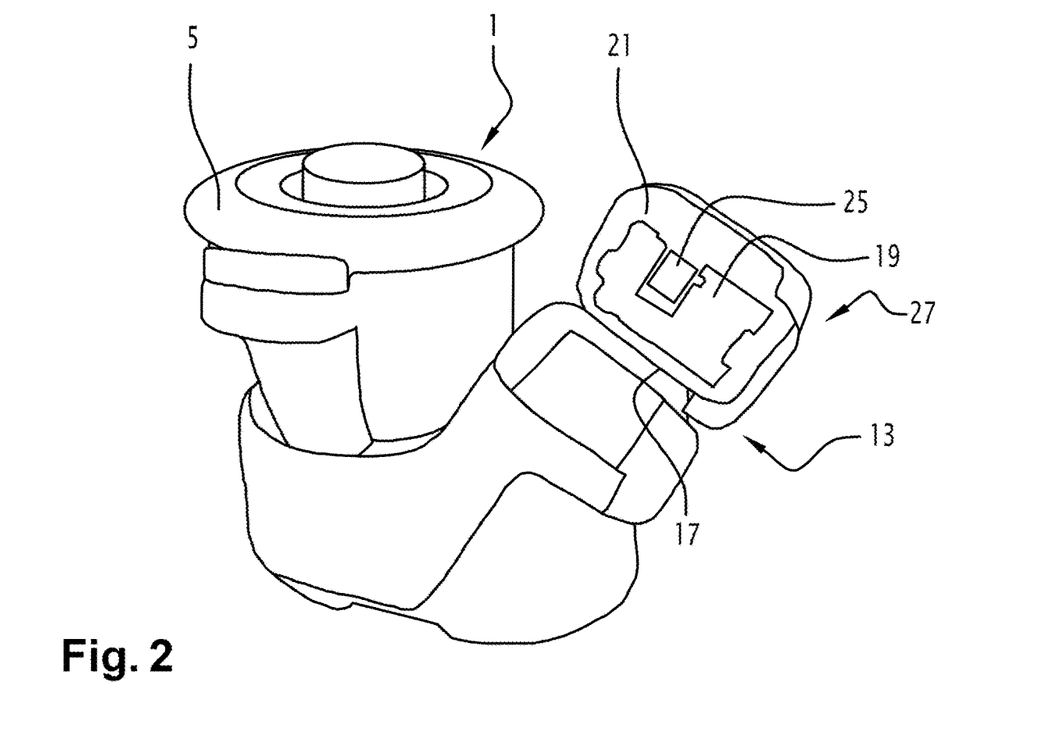
FIG. 2 is a perspective view of the culinary preparation apparatus.
Figure 3:
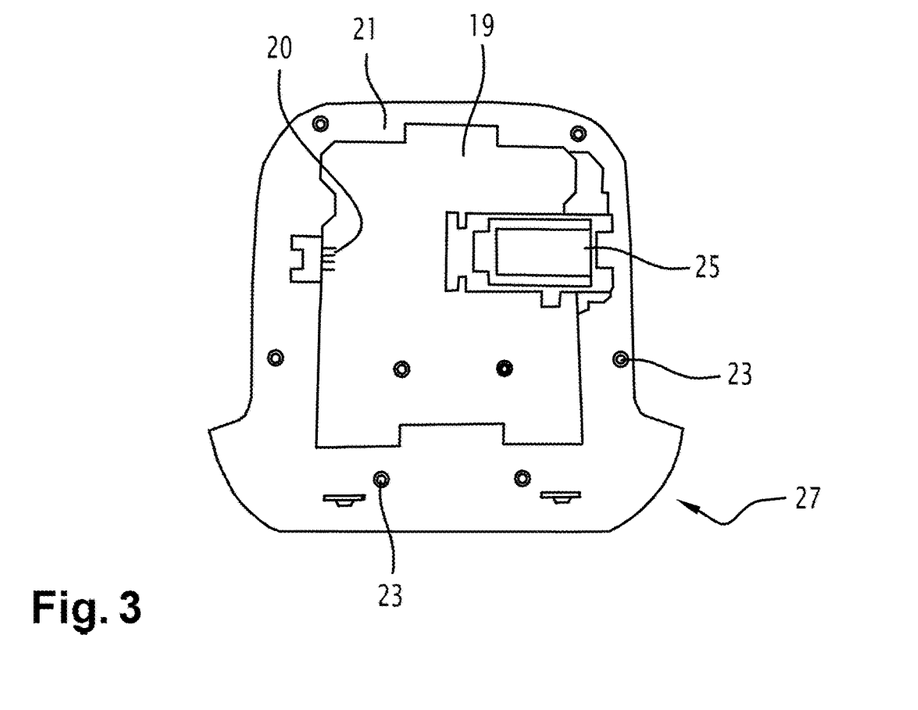
FIG. 3 is a front view of a part of a case of the culinary preparation apparatus.

As illustrated in FIGS. 2 to 4, the case 13 comprises a hinge 17 arranged to allow the opening of the case 13. The control entity C comprises a power circuit 18 and a control circuit 19.

The power circuit 18 is internal to the culinary preparation apparatus A. Furthermore, the control entity C comprises a switch int arranged to supply the power circuit with electrical current in a closed position.

The control entity C further comprises two probes son1 and son2 for measuring the internal temperature of the cooking container, each being arranged to control stopping of the power supply when an accurate temperature threshold is reached.

A first temperature threshold corresponding to the probe son1 is for example the highest limit internal temperature not to be exceeded during operation of the apparatus A during a culinary preparation. A second threshold corresponding to the probe son2 is for example the limit temperature during the idling of the apparatus A.

The control entity C further comprises a probe son-v for measuring the rotational speed of the rotating element 9, the power circuit being arranged to cut off the power supply when the measured speed is outside a determined range.

The control circuit 19 comprises a socket 20 in order to be removably connected to the power circuit.

As illustrated in FIG. 3, the case 13 comprises a support 21 provided with fasteners 23 such as screws. The support 21 may thus be secured to the rest of the case 13. The support 21 is also dismountable. The dismounting is made when the case 13 is open as in FIG. 2.

The control entity C further comprises a communication circuit 25 connected to the control circuit 19 and arranged to communicate according to a known communication protocol, for example a bidirectional communication protocol through radio-waves.

The control panel 15, the control circuit 19 and the communication circuit 25 are attached onto the support 21. This interface and control set 27 shown in FIG. 3 and comprising the elements 15, 16, 19, 25 and 21, is thus dismountable from the rest of the culinary preparation apparatus A. The dismounting is symbolized by a line in FIG. 4.

The control entity C is arranged to send and receive pieces of information according to the known communication protocol thanks to the communication circuit 25.

It is thus possible for the culinary preparation apparatus A to exchange pieces of information with a remote terminal Te.

As illustrated in FIG. 1, such a terminal Te is also arranged to communicate according to the communication protocol with the culinary preparation apparatus A and thus remotely control the culinary preparation apparatus A as detailed below.

The control of the culinary preparation apparatus involves an internal control method of the culinary preparation apparatus A performed by said apparatus A and a control method performed by the terminal Te.

Figure 5:
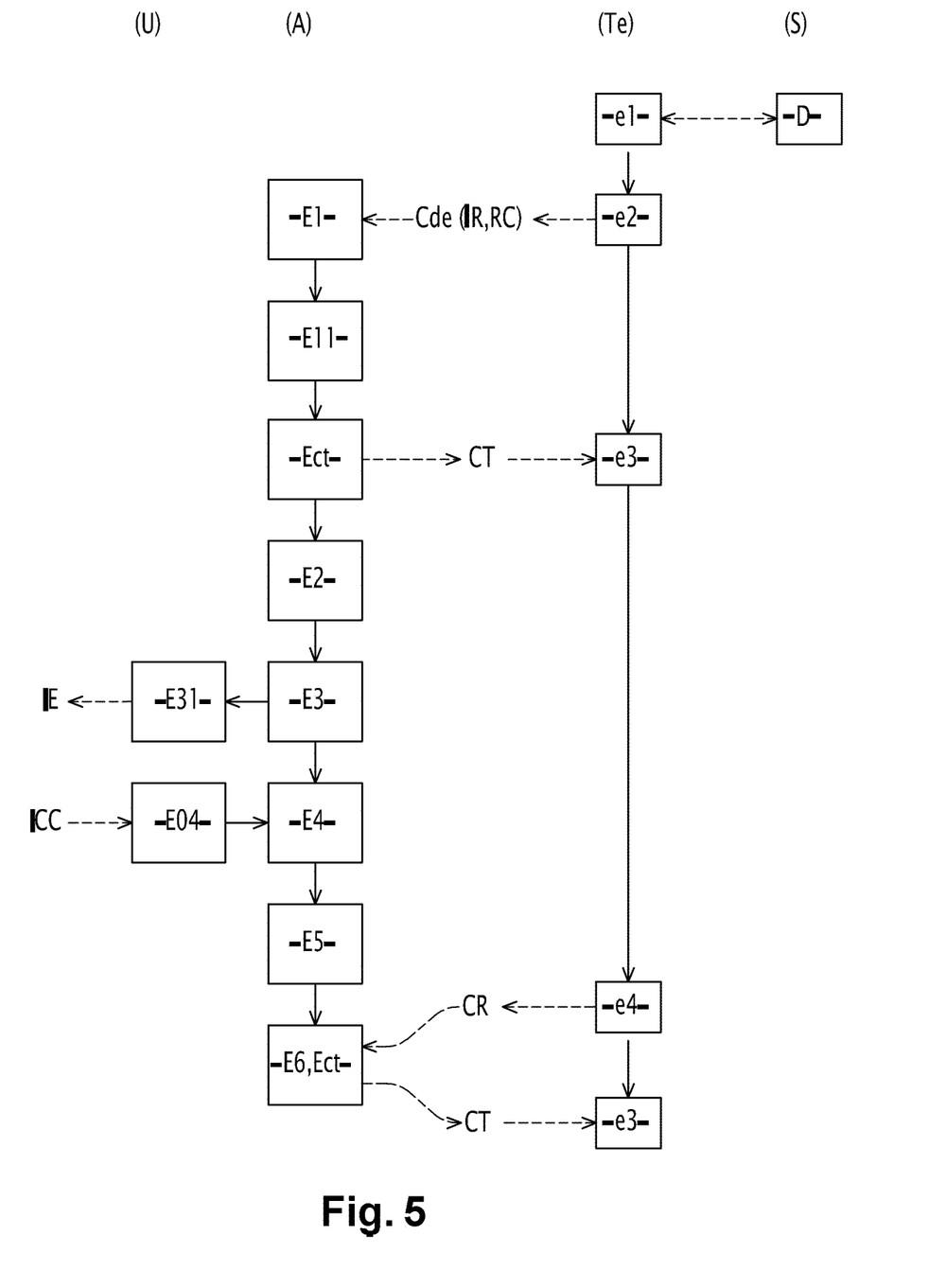
FIG. 5 is a diagram showing the steps of a method for controlling the culinary preparation apparatus.

As illustrated in FIG. 5, the method for controlling the culinary preparation apparatus A by the terminal Te comprises a step e1 of selecting a determined task T intended to be accomplished by the culinary preparation apparatus A.

This selection is made by using an executable application installed on the terminal Te. The determined task T may correspond to a step of a cooking recipe.

Thus, the application allows the user to choose a cooking recipe, the selection of each determined task T being then automated by the application for the complete execution of the recipe.

The user may also have access to a database D located in a remote server S for example accessible via Internet. The terminal Te is thus arranged to communicate with the management system of the database D and download data corresponding to particular tasks T or particular recipes.

The method for controlling the culinary preparation apparatus A by the terminal Te comprises a step e2 consisting in sending a control piece of information Cde to the culinary preparation apparatus A.

The control piece of information Cde comprises a control instruction IC related to said task T to be executed. The control piece of information Cde may also comprise a monitoring request RC.

The monitoring request RC aims at obtaining a feedback, that is to say, a monitoring piece of information CT coming from the culinary preparation apparatus A The monitoring piece of information CT may correspond to the progress of the execution of the determined task T or to an operation anomaly of the culinary preparation apparatus A which has been detected by a sensor of said apparatus. This is the case for example when the closure lid 5 is open during a task.

The monitoring piece of information CT can also signal the proper operation of the culinary preparation apparatus A.

The internal control method of the culinary preparation apparatus A then comprises a step E1 of receiving the control piece of information Cde.

The culinary preparation apparatus then carries out a configuration step E11 consisting in checking the ability of the functional element(s) F involved in the execution of the determined task T.

This configuration step E11 further consists in arranging the involved functional element(s) F so that they are disposed in the configuration allowing to execute the determined task T.

This arrangement and checking step is necessary from the point of view of the safe use of the culinary preparation apparatus A.

In FIG. 5, a step Ect of emitting a monitoring piece of information CT by the control entity C is shown corresponding to a monitoring request RC emitted by the terminal Te.

This step follows step E1 in the embodiment shown, but may be carried out at any time during the operation of the culinary preparation apparatus A independently of the execution of a task T.

This step Ect of emitting a monitoring piece of information CT can be carried out after receiving a monitoring request CT or at the initiative of the culinary preparation apparatus A, that is to say after a particular event or on a regular basis.

The terminal Te then proceeds to a step e3 of receiving this monitoring piece of information CT. The management application of the execution of the task is updated thanks to this monitoring piece of information CT.

In this specific case, the monitoring piece of information CT may comprise a message of the type: "the culinary preparation apparatus A has received the control piece of information Cde and is ready to execute the corresponding task T".

The culinary preparation apparatus A then carries out a step E2 of generating a state piece of information IE. This state piece of information IE is related to the ability of the determined functional element(s) F to execute said control instruction IC received previously.

The state piece of information IE is thus to be considered as a simple piece of information which may have the meaning "yes, the culinary preparation apparatus A is ready to execute the task T" or "no, the apparatus is not in an arrangement allowing to execute the task T".

This state piece of information IE is generated by the control entity C then, in a step E3, transmitted to the warning device DA which, in a step E31, emits a signal S related to said state piece of information IE.

This piece of information is emitted when the status of the state piece of information IE status is "yes, the culinary preparation apparatus is ready to execute the task T".

The user must be in the vicinity of the culinary preparation apparatus A in order to perceive the signal. Thus, from the point of view of the user, after having launched the execution of a task on the terminal Te, he must get close the culinary preparation apparatus in order to perceive the signal S.

Thus, the user is capable of noting that everything is in accordance with a good use of the culinary preparation apparatus A and that the arrangement around the apparatus A is optimal so that the task T which will be launched takes place in good conditions.

This is the case if, for example, before a cooking task T, no heat-sensitive element is in the immediate vicinity of the apparatus A or no child is playing in the vicinity of the apparatus A.

The user then proceeds to an input of a confirmatory control instruction ICC at the user interface U of the culinary preparation apparatus A.

This confirmatory control piece of information ICC is a simple validation that does not require a specific technicality. Indeed, all the setting parameters related to the task T to be executed have already been determined in the previous steps. It is therefore not a setting.

The confirmatory control piece of information ICC consists for example in pressing a button which may also comprise a light element of the warning device DA.

Thus, the validation is very simple from the point of view of the user: he sees a button light up, which indicates that the culinary preparation apparatus A is ready to execute a task T, then he presses this button in order to launch the execution of the task T.

This input thus induces a step E04 of acquiring the confirmatory control instruction ICC by the user interface U which is followed by a step E4 of receiving a confirmatory control instruction ICC by the control entity C.

The control entity C then proceeds to a step E5 of triggering the execution of a determined task T corresponding to the control instruction IC.

The determined task T is then executed by the involved functional element(s) F in a step E6. FIG. 5 also shows the sending by the terminal T of a monitoring request RC in a step e4. The terminal then receives a monitoring piece of information CT as explained before in a step e3.

During step E6, the monitoring entity C manages the execution of the task T. Thus, the proper conduct of the step is managed locally, which avoids any sudden interruption in case of communication cut-off between the terminal T and the culinary preparation apparatus A The present method thus provides the advantages of offsetting part of the memory of the control entity C, because the parameters defining the tasks T are not required to be stored locally.

Thus, when new recipes comprising a set of tasks T or when new functional elements T may be adapted to the culinary preparation apparatus A, it is not necessary to change the control entity C Furthermore, this offsetting is only partial because, during operation, from the moment when the control instruction IC has reached the control entity C, the culinary preparation apparatus A manages by itself the execution of the task T.

Furthermore, for an enhanced safety, the presence of a user in the vicinity of the apparatus A is necessary for triggering a task T, which avoids unwanted start-up due to a remote control.

It goes without saying that the invention is not limited to the sole embodiment of this control method, of this terminal and of this culinary preparation apparatus, described above by way of example, it encompasses on the contrary all the variants.

The invention claimed is:

1. An internal control method of a culinary preparation apparatus comprising a control entity arranged to receive control pieces of information according to a communication protocol and at least one functional element capable of being controlled by the control entity and capable of performing a task, the internal control method of the culinary preparation apparatus comprising, for each stage of a recipe preparation including a plurality of stages, the following steps:
   (E1) receiving a control piece of information comprising a control instruction related to at least one functional element determined by the control entity, then (E11) a configuration step carried out by the control entity and consisting in checking an ability of the at least one functional element to execute the control instruction and/or in arranging the at least one functional element for execution of the task, (E2) generating a state piece of information by the control entity, the state piece of information being related to the ability of the at least one functional element to execute the control instruction, (E3) transmitting the state piece of information by the control entity to a warning device of the culinary preparation apparatus, the warning device being capable of emitting a signal related to the state piece of information, (E31) after the step of transmitting the state piece of information by the control entity to the warning device, emitting the signal related to the state piece of information by the warning device, the signal being a physical signal perceptible by a user, (E04) acquiring a confirmatory control instruction from a user interface of the culinary preparation apparatus, wherein the warning device is a button capable of being illuminated and the confirmatory control instruction is an input provided by pressing the button when illuminated, (E4) receiving the confirmatory control instruction by the control entity from the user interface of the culinary preparation apparatus, (E5) triggering execution of the task that is determined by the at least one functional element and corresponding to the confirmatory control instruction, then (E6) executing the task determined by the at least one functional element determined by the control entity corresponding to the control instruction, the task corresponding to the execution by the at least one functional element determined by the control entity of at least one elementary operation according to a determined operating time and/or according to a determined power and/or according to a setting determined by the at least one determined functional element, (Ect) emitting monitoring pieces of information by the control entity, each corresponding to a monitoring request received by the control entity and a) concerning the progress of the execution of the task during the step of (E6) executing the task and/or b) concerning an operation anomaly of the culinary preparation apparatus and/or c) concerning an operation conformity of the culinary preparation apparatus during the configuration step (E11) or the step of executing the task (E6), wherein the emitted monitoring pieces of information are included in the control piece of information and are also sent separately.

2. The internal control method of a culinary preparation apparatus according to claim 1, wherein the at least one elementary operation corresponds to a culinary preparation step of at least one food disposed in at least one working container of the culinary preparation apparatus.

3. The internal control method of a culinary preparation apparatus according to claim 2, wherein the control entity is capable of performing interruption and/or resumption of the task during the step (E6) of executing the task.

4. The internal control method of a culinary preparation apparatus according to claim 1, wherein the control entity is capable of performing interruption and/or resumption of the task during the step (E6) of executing the task.

5. A culinary preparation apparatus arranged to execute the steps of the internal control method according to claim 1.

* * * * *